_(12)_ United States Patent
Taniguchi et al.

(10) Patent No.: US 8,402,077 B2
(45) Date of Patent: Mar. 19, 2013

(54) AMPLITUDE CALCULATION APPARATUS OF OUTPUT SIGNAL OF ENCODER AND AMPLITUDE CALCULATION PROGRAM OF OUTPUT SIGNAL OF ENCODER

(75) Inventors: Mitsuyuki Taniguchi, Gotenba (JP); Hirofumi Kukuchi, Fujiyoshida (JP); Tadayoshi Matsuo, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 1121 days.

(21) Appl. No.: 11/760,968

(22) Filed: Jun. 11, 2007

(65) Prior Publication Data

US 2007/0297535 A1 Dec. 27, 2007

(30) Foreign Application Priority Data

Jun. 21, 2006 (JP) ................................. 2006-171668

(51) Int. Cl.
*G06F 7/38* (2006.01)
*G06F 7/552* (2006.01)

(52) U.S. Cl. ......................... 708/605; 708/440; 708/500

(58) Field of Classification Search .................. 708/490, 708/200–209, 605
See application file for complete search history.

(56) References Cited

U.S. PATENT DOCUMENTS

| | | | | |
|---|---|---|---|---|
| 4,599,701 A * | 7/1986 | Vojir et al. | ...................... | 708/605 |
| 5,120,954 A * | 6/1992 | Taniguchi | ................ | 250/231.16 |
| 5,787,124 A * | 7/1998 | Shimura | ...................... | 375/328 |
| 5,862,068 A * | 1/1999 | Onodera | ...................... | 708/605 |
| 5,970,093 A * | 10/1999 | de Lantremange | ........... | 708/323 |
| 5,973,620 A * | 10/1999 | Holzapfel et al. | .............. | 341/11 |
| 5,987,073 A * | 11/1999 | Knutson | ...................... | 375/326 |
| 6,070,181 A * | 5/2000 | Yeh | ................ | 708/605 |
| 6,553,399 B1 * | 4/2003 | Yeh et al. | ...................... | 708/605 |
| 6,556,153 B1 * | 4/2003 | Cardamone | ................... | 341/111 |
| 6,658,445 B1 * | 12/2003 | Gau et al. | ...................... | 708/605 |
| 7,379,957 B2 * | 5/2008 | Tien et al. | ...................... | 708/605 |
| 7,529,320 B2 * | 5/2009 | Byrne et al. | .................. | 375/326 |
| 2004/0095583 A1 * | 5/2004 | Tamiya et al. | ................. | 356/499 |
| 2005/0280563 A1 * | 12/2005 | Teraguchi | ...................... | 341/50 |
| 2006/0076480 A1 * | 4/2006 | Kiriyama et al. | ........ | 250/231.16 |
| 2006/0077083 A1 * | 4/2006 | Kiriyama et al. | ............. | 341/120 |
| 2006/0186360 A1 * | 8/2006 | Remillard et al. | ......... | 250/559.1 |
| 2009/0034641 A1 * | 2/2009 | Jansson | ........................ | 375/261 |
| 2009/0175380 A1 * | 7/2009 | Bode et al. | ................... | 375/300 |

FOREIGN PATENT DOCUMENTS

| | | | |
|---|---|---|---|
| JP | 54148350 A | | 11/1979 |
| JP | 58034865 B | | 7/1983 |
| JP | 2005308547 A | | 11/2005 |

* cited by examiner

*Primary Examiner* — Chat Do
*Assistant Examiner* — Matthew Sandifer
(74) *Attorney, Agent, or Firm* — Lowe Hauptman Ham & Berner, LLP (57) ABSTRACT

An amplitude calculation apparatus or an amplitude calculation program of an output signal of an encoder dividing a resurge waveform into a predetermined number of angle areas, presetting and storing coefficient α of the A-phase and the coefficient β of the B-phase corresponding to the divided angle areas, the coefficients being set so that αA+βB approximates the radius of the theoretical resurge waveform, calculating the radius of the resurge waveform as αA+βB, and making the calculated radius the amplitude of the output signal of the encoder or converting a phase angle θ of a quadrant n to a phase angle θ' of the quadrant 1, and calculating the radius of the resurge waveform as α|A|+β|B|, whereby the circuit size of the apparatus for calculating the resurge radius from the output of the encoder is reduced and the processing time by software for calculating the resurge radius is shortened.

2 Claims, 7 Drawing Sheets

| $\theta$ | $\alpha$ | $\beta$ |
|---|---|---|
| $0 \leq \theta < \pi/16$ | $2^0$ | $2^{-4}$ |
| $\pi/16 \leq \theta < 2\pi/16$ | $2^{-1}+2^{-2}+2^{-3}+2^{-4}$ | $2^{-2}+2^{-3}$ |
| $2\pi/16 \leq \theta < 3\pi/16$ | $2^{-1}+2^{-2}+2^{-3}$ | $2^{-1}$ |
| $3\pi/16 \leq \theta < 4\pi/16$ | $2^{-1}+2^{-3}+2^{-4}$ | $2^{-1}+2^{-2}$ |
| $4\pi/16 \leq \theta < 5\pi/16$ | $2^{-1}+2^{-2}$ | $2^{-1}+2^{-3}+2^{-4}$ |
| $5\pi/16 \leq \theta < 6\pi/16$ | $2^{-1}$ | $2^{-1}+2^{-2}+2^{-3}$ |
| $6\pi/16 \leq \theta < 7\pi/16$ | $2^{-2}+2^{-3}$ | $2^{-1}+2^{-2}+2^{-3}+2^{-4}$ |
| $7\pi/16 \leq \theta < 8\pi/16$ | $2^{-4}$ | $2^0$ |
| ⋮ | | |
| $31\pi/16 \leq \theta < 32\pi/16$ | $2^0$ | $-2^{-4}$ |

θ =QUADRANT 1 (A≧0, B≧0)

θ =QUADRANT 2 (A<0, B≧0)

θ =QUADRANT 3 (A<0, B<0)

θ =QUADRANT 4 (A≧0, B<0)

AMPLITUDE CALCULATION APPARATUS OF OUTPUT SIGNAL OF ENCODER AND AMPLITUDE CALCULATION PROGRAM OF OUTPUT SIGNAL OF ENCODER

CROSS-REFERENCE TO RELATED APPLICATIONS

This application is based upon and claims a priority of Japanese Patent Application No. 2006-171668, filed Jun. 21, 2006, the contents being incorporated herein by reference.

BACKGROUND OF THE INVENTION

1. Field of the Invention

The present invention relates to an amplitude calculation apparatus of an output signal of an encoder and amplitude calculation program of an output signal of an encoder detecting a linear displacement, angle, angular speed, etc. between members.

2. Description of the Related Art

An encoder is used for detecting the angle and radius (Lissajous radius) at sampling points of a Lissajous waveform based on digital signal values A and B obtained by sampling at the same timing the sine wave signals differing in phase by about 90 degrees output from a detector due to mutual movement between members or signals similar to the same, that is, an A-phase signal and B-phase signal, and converting them from an analog to digital format. The Lissajous radius corresponds to the amplitude of the output signal of an encoder.

In the prior art, as described in Japanese Patent Publication (A) No. 2005-308547, the resurge radius R is calculated as $R=(A^2+B^2)^{1/2}$.

Figure 1:
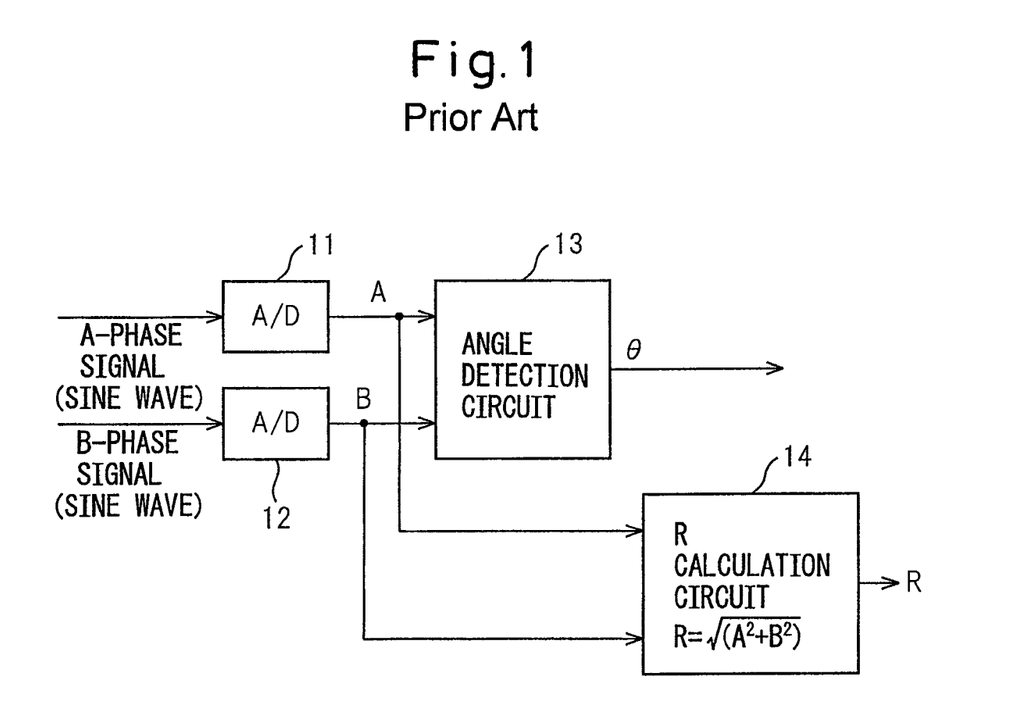
FIG. 1 is a schematic block diagram showing a conventional amplitude calculation apparatus of an output signal of an encoder.

FIG. 1 is a schematic block diagram showing a conventional amplitude calculation apparatus of an output signal of an encoder. In the figure, 11 indicates an A/D converter converting from an analog to digital format the output of a detector (not shown) detecting the linear displacement, angle, angular speed, etc. of members, that is, an A-phase signal (sine wave), and outputting a digital value A, 12 indicates an A/D converter converting from an analog to digital format a B-phase signal (sine wave) of the same member differing in phase from the A-phase signal by exactly 90° and outputting a digital value A, 13 indicates an angle detection circuit detecting a phase difference θ between the A-phase and B-phase based on the A-value and B-value, and 14 indicates an R calculation circuit calculating the Lissajous radius R.

As shown in the figure, in the past, the radius R of the resurge waveform has been calculated as $R=(A^2+B^2)^{1/2}$.

Past calculations include calculation of the squares and calculation of the square roots of the digital values A and B, so if calculated by hardware, the circuit size becomes larger and calculation by software ends up taking time.

SUMMARY OF THE INVENTION

An object of the present invention is to reduce the circuit size of an apparatus calculating the Lissajous radius from the output of an encoder and shortening the processing time by software calculating the Lissajous radius.

To achieve the above object, according to a first aspect of the present invention, there is provided an amplitude calculation apparatus of an output signal of an encoder provided with a sampling means for sampling, at the same timing, an A-phase sine wave signal or a signal resembling the A-phase sine wave signal and a B-phase sine wave signal or a signal resembling the B-phase sine wave signal differing in phase by exactly a predetermined angle and thereby outputting an A/D converted value A of the A-phase sine wave signal or a signal resembling the A-phase sine wave signal and an A/D converted value B of the B-phase sine wave signal or a signal resembling the B-phase sine wave signal, an angle detection circuit for finding a phase angle θ at different sampling points of a Lissajous waveform obtained by plotting the A/D converted value A of the A-phase sine wave signal or a signal resembling the A-phase sine wave signal and the A/D converted value B of the B-phase sine wave signal or a signal resembling the B-phase sine wave signal at the sampling points by the sampling means on an X-axis and Y-axis, a coefficient storing means for dividing the Lissajous waveform into a predetermined number of angle areas, storing in advance the A-phase coefficient α and B-phase coefficient β corresponding to the divided angle areas, in which case, the coefficients being set so αA+βB approximates a radius of a theoretical Lissajous waveform, and a calculating means for calculating the radius of the Lissajous waveform as αA+βB and making the calculated radius the amplitude of the output signal of the encoder.

According to a second aspect of the present invention, there is provided an amplitude calculation apparatus of an output signal of an encoder provided with a sampling means for sampling, at the same timing, an A-phase sine wave signal or a signal resembling the A-phase sine wave signal and a B-phase sine wave signal or a signal resembling the B-phase sine wave signal differing in phase by exactly a predetermined angle and thereby outputting an A/D converted value A of the A-phase sine wave signal or a signal resembling the A-phase sine wave signal and an A/D converted value B of the B-phase sine wave signal or a signal resembling the B-phase sine wave signal, an angle detection circuit for finding a phase angle θ at different sampling points of a Lissajous waveform obtained by plotting the A/D converted value A of the A-phase sine wave signal or a signal resembling the A-phase sine wave signal and the A/D converted value B of the B-phase sine wave signal or a signal resembling the B-phase sine wave signal at the sampling points by the sampling means on an X-axis and Y-axis, a means for finding a quadrant n of the phase angle θ from polarities of the A/D converted value A and the A/D converted value B, where, $$\{(n-1)/2\}\pi \leq \theta < (n/2)\pi,$$

where n is 4 or a smaller natural number and converting the phase angle θ of the quadrant n to a phase angle θ' of a quadrant 1, a coefficient storing means for dividing the Lissajous waveform into a predetermined number of angle areas in the quadrant 1 and presetting and storing in advance an A-phase coefficient α and B-phase coefficient β in accordance with the divided angle areas, in which case, the coefficients being set so α|A|+β|B| approximates a radius of a theoretical Lissajous waveform, and a calculating means for calculating the radius of the Lissajous waveform as α|A|+β|B| and making the calculated radius the amplitude of the output signal of the encoder.

According to a third aspect of the present invention, there is provided an amplitude calculation program of an output signal of an encoder making a computer perform a step of sampling, at the same timing, an A-phase sine wave signal or a signal resembling the A-phase sine wave signal and a B-phase sine wave signal or a signal resembling the B-phase sine wave signal differing in phase by exactly a predetermined angle and thereby outputting an A/D converted value A of the A-phase sine wave signal or a signal resembling the A-phase sine wave signal and an A/D converted value B of the B-phase sine wave signal or a signal resembling the B-phase sine wave signal, a step of finding a phase angle θ at different sampling points of a Lissajous waveform obtained by plotting the A/D converted value A of the A-phase sine wave signal or a signal resembling the A-phase sine wave signal and the A/D converted value B of the B-phase sine wave signal or a signal resembling the B-phase sine wave signal at the sampling points by the sampling on an X-axis and Y-axis, a step of dividing the Lissajous waveform into a predetermined number of angle areas and storing in advance the A-phase coefficient α and B-phase coefficient β corresponding to the divided angle areas, in which case, the coefficients being set so αA+βB approximates a radius of a theoretical Lissajous waveform, and a step of calculating the radius of the Lissajous waveform as αA+βB and making the calculated radius the amplitude of the output signal of the encoder.

According to a fourth aspect of the present invention, there is provided an amplitude calculation program of an output signal of an encoder making a computer perform a step of sampling, at the same timing, an A-phase sine wave signal or a signal resembling the A-phase sine wave signal and a B-phase sine wave signal or a signal resembling the B-phase sine wave signal differing in phase by exactly a predetermined angle and thereby outputting an A/D converted value A of the A-phase sine wave signal or a signal resembling the A-phase sine wave signal and an A/D converted value B of the B-phase sine wave signal or a signal resembling the B-phase sine wave signal, a step of finding a phase angle θ at different sampling points of a Lissajous waveform obtained by plotting the A/D converted value A of the A-phase sine wave signal or a signal resembling the A-phase sine wave signal and the A/D converted value B of the B-phase sine wave signal or a signal resembling the B-phase sine wave signal at the sampling points by the sampling on an X-axis and Y-axis, a step of finding a quadrant n of the phase angle θ from polarities of the A/D converted value A and the A/D converted value B, where, $$\{(n-1)/2\}\pi \leq \theta(n/2)\pi,$$

where n is 4 or a smaller natural number and converting the phase angle θ of the quadrant n to a phase angle θ' of a quadrant 1, a step of dividing the Lissajous waveform into a predetermined number of angle areas in the quadrant 1 and presetting and storing in advance an A-phase coefficient α and B-phase coefficient β in accordance with the divided angle areas, in which case, the coefficients being set so α|A|+β|B| approximates a radius of a theoretical Lissajous waveform, and a step of calculating a radius of the Lissajous waveform as α|A|+β|B| and making the calculated radius the amplitude of the output signal of the encoder.

According to the present invention, calculation of the radius of the Lissajous waveform does not require calculation of the squares or calculation of the square roots, so when realizing this by hardware, the circuit size becomes smaller, while when realizing it by a program, the processing time is shortened.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, embodiments of the present invention will be explained.

First Embodiment

Figure 2:
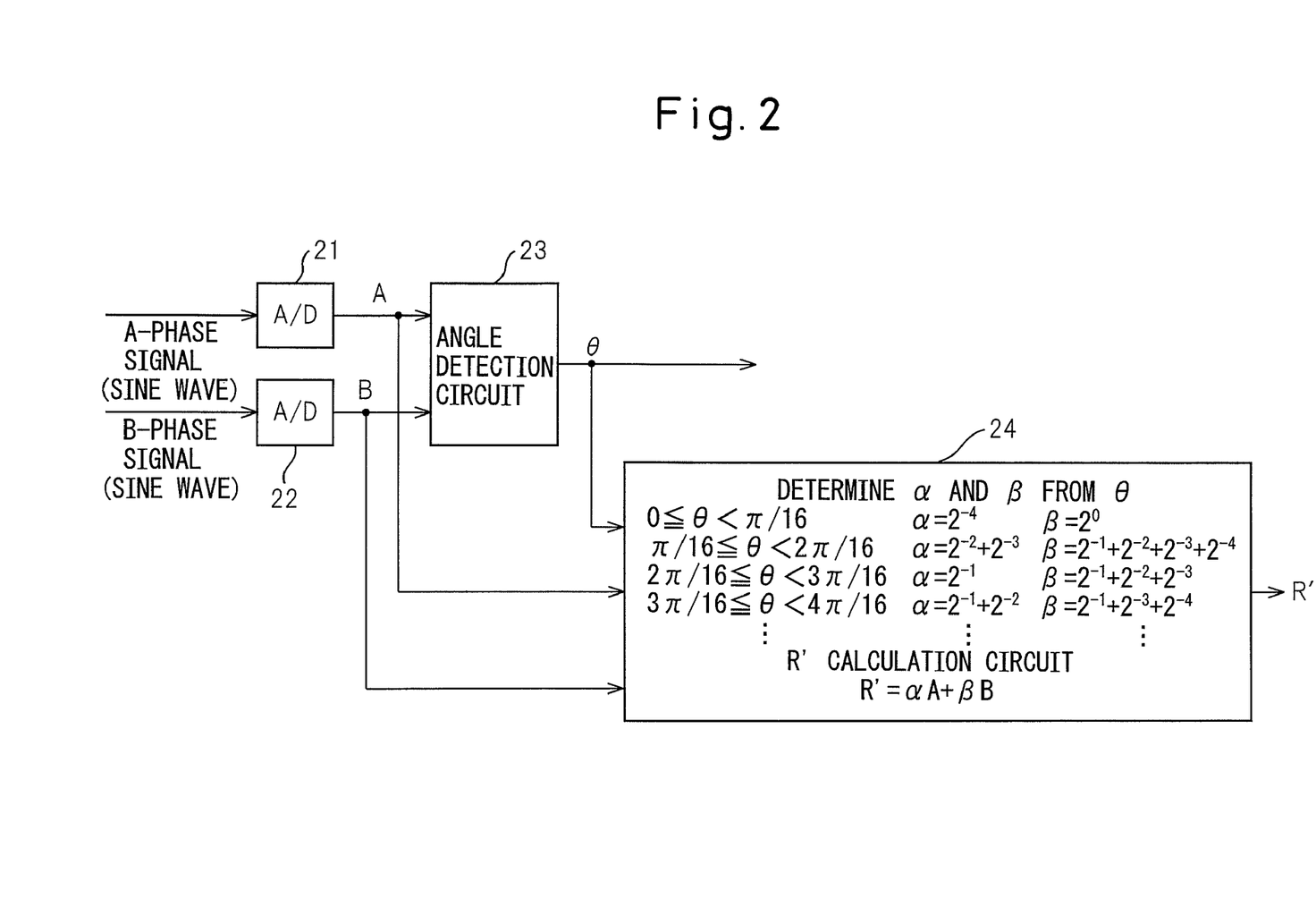
FIG. 2 is a schematic block diagram showing an amplitude calculation apparatus of an output signal of an encoder according to a first embodiment of the present invention.

FIG. 2 is a schematic block diagram showing an amplitude calculation apparatus of an output signal of an encoder according to a first embodiment of the present invention. In the figure, the A/D converters 21, 22 and angle detection circuit 23 are the same as the A/D converters 11, 12 and angle detection circuit 13 shown in FIG. 1.

According to the first embodiment of the present invention, the R' calculation circuit 24 for calculating the radius R' of the Lissajous waveform is connected to the outputs of the A/D converters 21, 22 and angle detection circuit 23.

Figure 3:
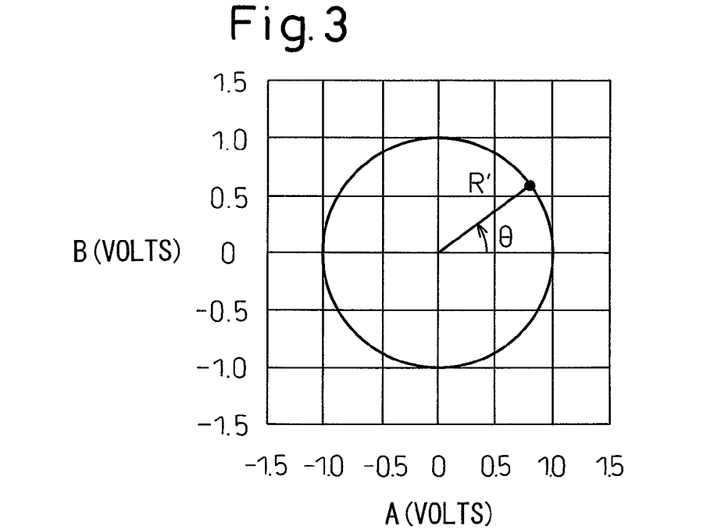
FIG. 3 is a view showing a theoretical Lissajous waveform in a first embodiment of the present invention.

FIG. 3 is a view showing the theoretical Lissajous waveform normalized to the radius R=1 in the first embodiment of the present invention. In the figure, the abscissa indicates the A-value, while the ordinate indicates the B-value. Both the A-value and B-value are in units of voltage, that is, volts. If the A-phase signal and the B-phase signal are complete sine waves and have a phase difference of 90°, a true circular theoretical Lissajous waveform is obtained as illustrated, but when the waveform of one or more of the phases is not a complete sine wave but is a quasi sine wave or when the phase difference between the A-phase and B-phase is off from 90°, it is learned that the Lissajous waveform is not a true circle, but an ellipse.

Figure 4:
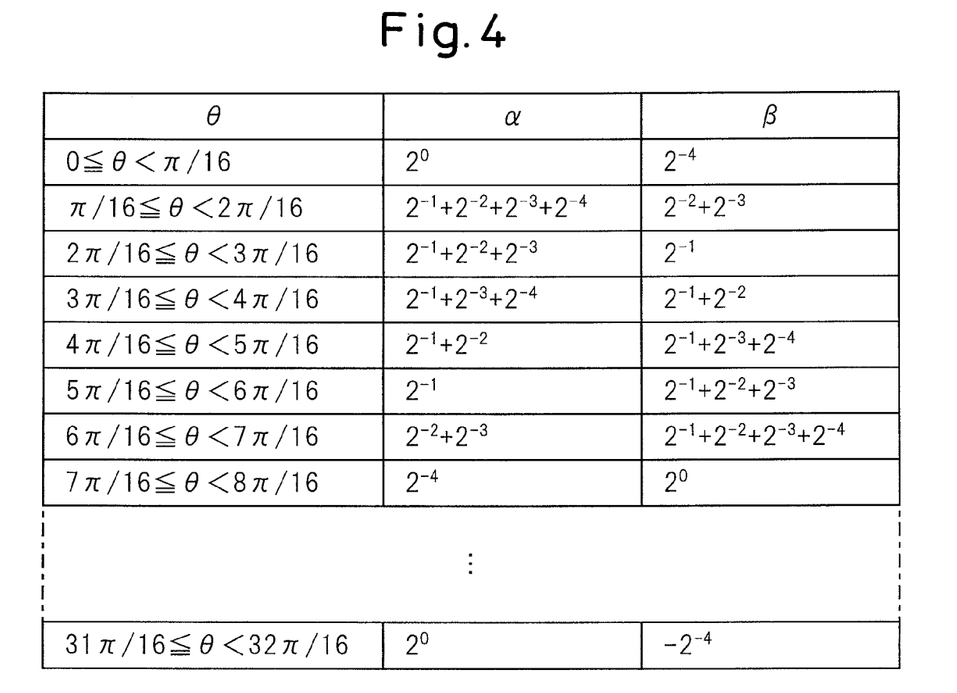
FIG. 4 is a view showing the relationship between an angle θ of a Lissajous waveform and coefficients α and β according to a first embodiment of the present invention.

FIG. 4 is a table showing the relationship of the angle θ of the Lissajous waveform and the coefficients α and β according to a first embodiment of the present invention. In the first embodiment, both the A-value and B-value are assumed to be digital signals expressed by 5 bits, the 2π angle is divided into 32 $\frac{1}{16}\pi$ areas, and the coefficients α and β are made predetermined 4-bit numbers for each angle area. The predetermined 4-bit numbers are set so as to make αA+βB approximate the radius R of the theoretical Lissajous waveform shown in FIG. 3.

Specifically, when angle area is $0 \leq \theta < \alpha/16$, the Lissajous radius R' is mainly determined by the A-value. The effect of the B-value is the smallest, so α is set to $2^0$ and β is set to $2^{-4}$ in advance. At the next angle area $\pi/16 \leq \theta < 2\pi/16$, the effect of the A-value is slightly reduced and the effect of the B-value is slightly increased, so α is set to $2^{-1}+2^{-2}+2^{-3}+2^{-4}$ and β is set to $2^{-2}+2^{-3}$. Below, in the same way, the coefficients α and β in each angle area are set as illustrated. In the final angle area of the first quadrant, that is, $7\pi/16 \leq \theta < 8\pi/16$, it is learned that the Lissajous radius R' is mainly determined by the B-value and the effect of the A-value is the smallest, so α is set to $2^{-4}$ and β is set to $2^0$ in advance. Further, at the final angle area of the fourth quadrant, $31\pi/16 \leq \theta < 32\pi/16$, it is learned that the Lissajous radius R' is mainly determined by the A-value and the effect of the B-value is the smallest, so α is set to $2^0$ and β is set to $2^{-4}$.

The relationship of θ and α and β shown in FIG. 4 is only an example. In general, it is sufficient to set the coefficients α and β in advance by binary numbers of numbers of bits smaller than the number of bits of the A-value and B-value. By using the binary numbers, the processing at the digital calculation circuit, that is, the R' calculation circuit, becomes easy. However, the coefficients α and β are not limited to binary numbers. Any expression is possible if setting them so that αA+βB approximates the radius R of the theoretical Lissajous waveform.

Figure 5:
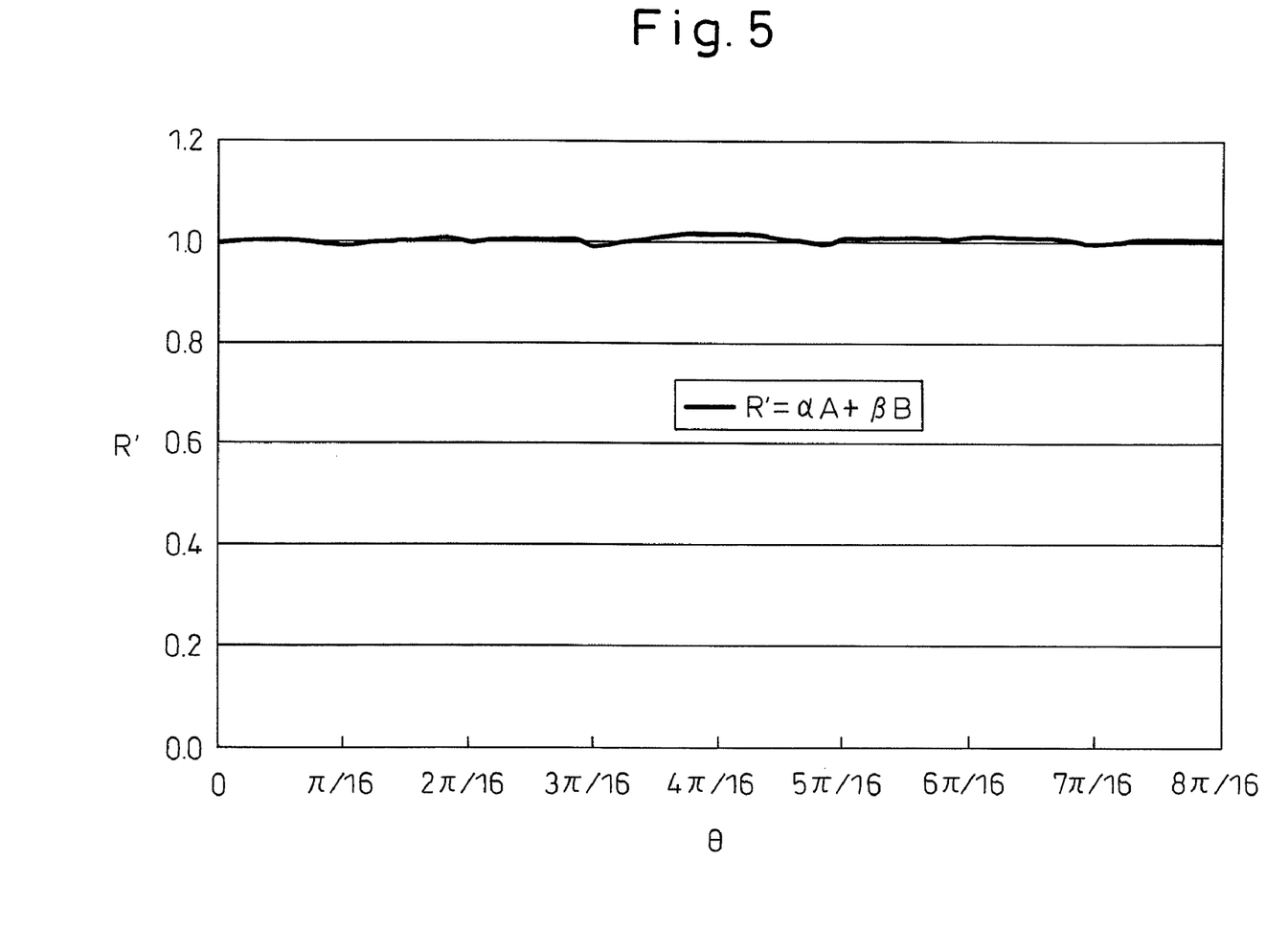
FIG. 5 is a graph for explaining the effect obtained by the first embodiment.

FIG. 5 is a graph for explaining the effects obtained according to the above first embodiment. The figure shows that the Lissajous radius R'=αA+βB in the case where the A-phase sine wave and B-phase sine wave are ideal sine waves and the phases differ by 90°. As shown in the figure, the Lissajous radius R' calculated by the first embodiment is not dependent on the angle θ and remains at the substantially constant value of 1.0.

Figure 6:
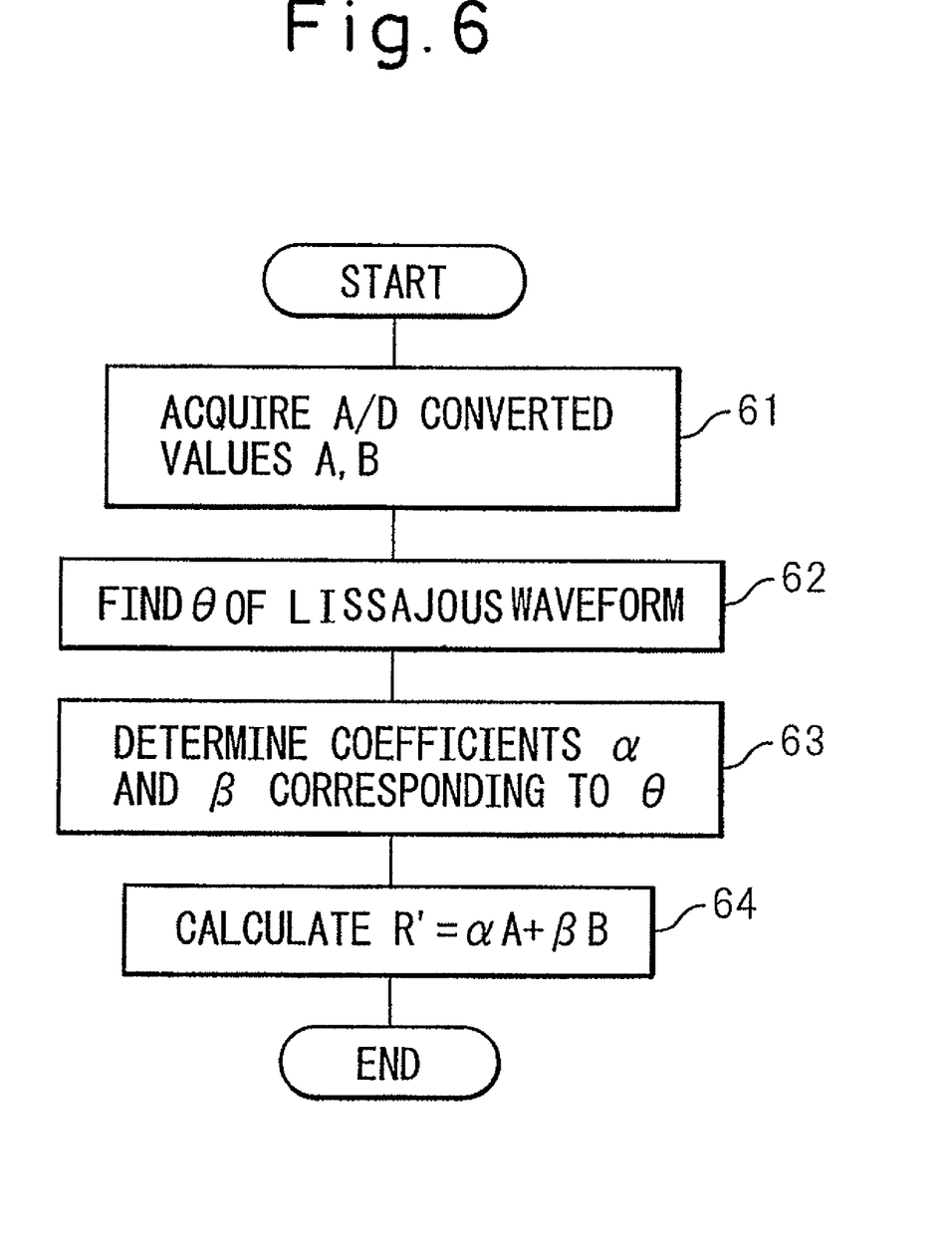
FIG. 6 is a flow chart of a program for running the operation of the first embodiment on a computer.

FIG. 6 is a flow chart of a program for making a computer perform the operation of the first embodiment. In the figure, at step 61, the program samples, at the same timing, an A-phase sine wave signal or a signal resembling the A-phase sine wave signal and a B-phase sine wave signal or a signal resembling the B-phase sine wave signal differing in phase by exactly a predetermined angle and thereby acquires an A/D converted value A of the A-phase sine wave signal or a signal resembling the A-phase sine wave signal and an A/D converted value B of the B-phase sine wave signal or a signal resembling the B-phase sine wave signal.

Next, at step 62, the program finds a phase angle θ at different sampling points of a Lissajous waveform obtained by plotting the A/D converted value A of the A-phase sine wave signal or a signal resembling the A-phase sine wave signal and the A/D converted value B of the B-phase sine wave signal or a signal resembling the B-phase sine wave signal at the sampling points by the sampling on an X-axis and Y-axis.

Next, at step 63, the program divides the Lissajous waveform into a predetermined number of angle areas and stores in advance the A-phase coefficient α and B-phase coefficient β corresponding to each of the divided angle areas, in which case, the coefficients being set so αA+βB approximates a radius of a theoretical Lissajous waveform.

Next, at step 64, the program calculates the radius R' of the Lissajous waveform as αA+βB. The thus obtained radius R' expresses the amplitude of the detection signal of the encoder of the signal.

Second Embodiment

Figure 7A:
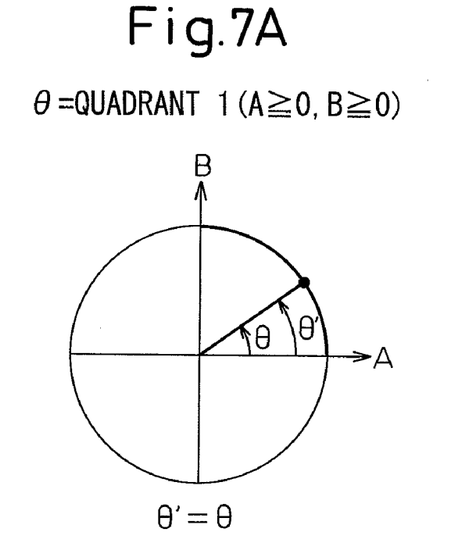
FIGS. 7A to 7D are views explaining conversion of angles θ of second to fourth quadrants of a Lissajous waveform to an angle θ' of a first quadrant according to the polarity of the A-value and B-value according to the second embodiment of the present invention.
Figure 7B:
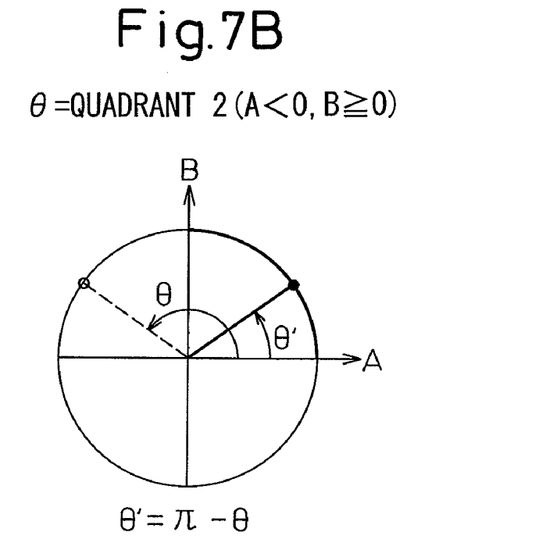
Figure 7C:
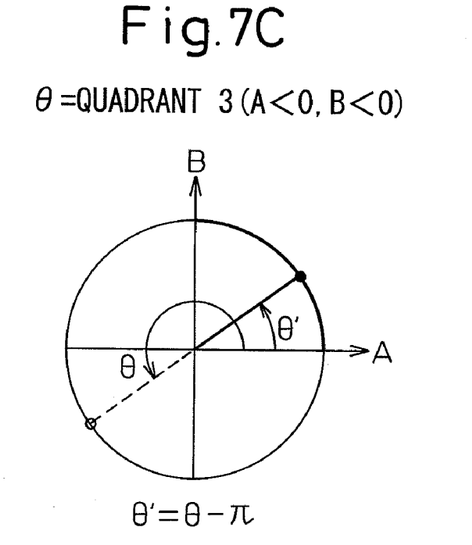
Figure 7D:
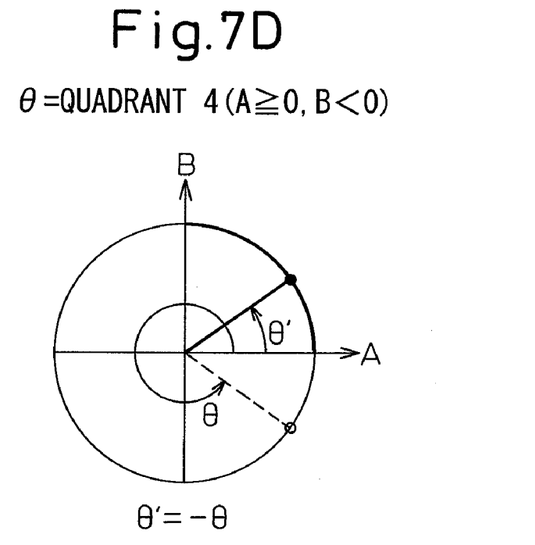

FIGS. 7A to FIG. 7D are views explaining conversion of angles θ of second to fourth quadrants of a Lissajous waveform to an angle θ' of a first quadrant according to the polarity of the A-value and B-value according to a second embodiment of the present invention. As shown in FIG. 7A, if A≧0, B≧0, the Lissajous radius is in the first quadrant, so the angle θ=θ'. As shown in FIG. 7B, if A<0, B≧0, the Lissajous radius is in the second quadrant, so by calculation of θ'=π−θ, θ' is obtained in the first quadrant. As shown in FIG. 7C, if A<0, B<0, the Lissajous radius is in the third quadrant, so by calculation of θ'=θ−π, θ' is obtained in the first quadrant. As shown in FIG. 7D, if A≧0, B<0, the Lissajous radius is in the fourth quadrant, so by calculation of θ'=−θ, θ' is obtained in the first quadrant.

α and β corresponding to the thus obtained θ' are set in advance in the same way as the table of FIG. 4. In that case, since the angles θ' are restricted to the first quadrant, in the example of FIG. 4, it is enough to use α and β corresponding to the angle area in the scope of the first quadrant from $0 \leq \theta' < \pi/16$ to $7\pi/16 \leq \theta' < 8\pi/16$ and the circuit size can be made smaller than the case of the first embodiment.

However, the A/D converted value A of the A-phase is negative in the second and third quadrants and the A/D converted value B of the B-phase is negative in the third and fourth quadrants, so in actual calculation of the radius R' of the Lissajous waveform, the R' is calculated by the approximation equation R'=α|A|+β|B| from the absolute value of the A/D converted value of the A-phase, the absolute value of the A/D converted value of the B-phase, and the processing ratios α, β.

Figure 8:
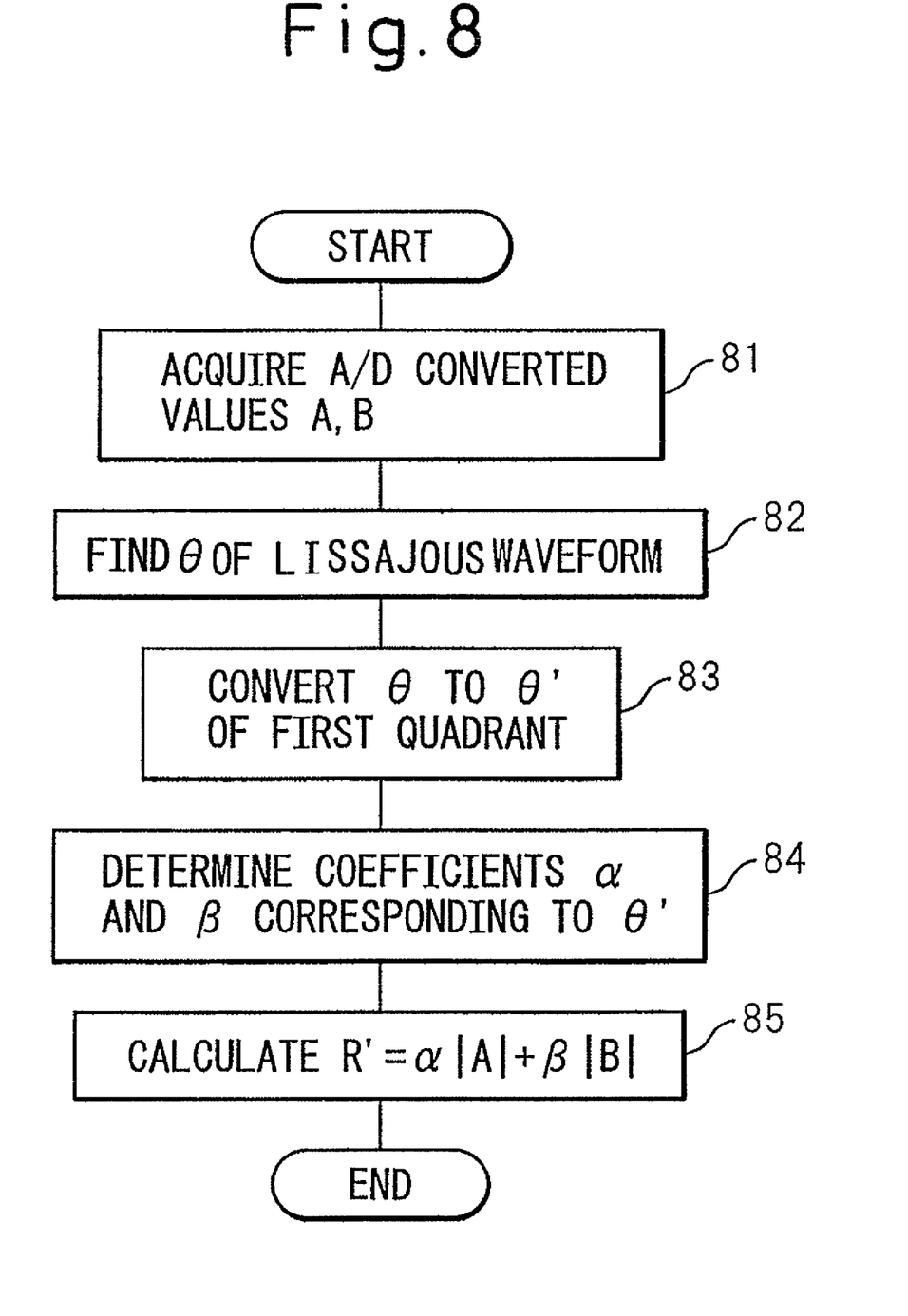
FIG. 8 is a flow chart of a program for running the operation of the second embodiment on a computer.

FIG. 8 is a flow chart of a program for making a computer perform the operation of the second embodiment. In the figure, at step 81, the program samples, at the same timing, an A-phase sine wave signal or a signal resembling the A-phase sine wave signal and a B-phase sine wave signal or a signal resembling the B-phase sine wave signal differing in phase by exactly a predetermined angle and thereby acquires an A/D converted value A of the A-phase sine wave signal or a signal resembling the A-phase sine wave signal and an A/D converted value B of the B-phase sine wave signal or a signal resembling the B-phase sine wave signal.

Next, at step 82, the program finds a phase angle θ at different sampling points of a Lissajous waveform obtained by plotting the A/D converted value A of the A-phase sine wave signal or a signal resembling the A-phase sine wave signal and the A/D converted value B of the B-phase sine wave signal or a signal resembling the B-phase sine wave signal at the sampling points by the sampling on an X-axis and Y-axis.

Next, at step 83, the program finds a quadrant n of the phase angle θ from the A/D converted value A and a polarity of the A/D converted value B, where, $$\{(n-1)/2\}\pi \leq \theta < (n/2)\pi,$$

where n is 4 or a smaller natural number and converting the phase angle θ of the quadrant n to a phase angle θ' of a quadrant 1.

Next, at step 84, the program divides the Lissajous waveform into a predetermined number of angle areas in the quadrant 1 and presets and stores in advance an A-phase coefficient α and B-phase coefficient β in accordance with the divided angle areas. In that case, the coefficients are set so α|A|+β|B| approximates a radius of a theoretical Lissajous waveform.

Next, at step 85, the program calculates the radius R' of the Lissajous waveform as α|A|+β|B|. The thus obtained radius R' expresses the amplitude of the detection signal of the encoder of the signal.

In the above embodiments, an example of dividing the angle area into π/16 areas was explained, but the present invention is not limited to this example. It is also possible to set α and β finer to raise the precision of approximation and conversely to set them coarser to enable the circuit size to be further reduced and the processing time to be shortened.

As clear from the above explanation, according to the present invention, just αA and βB are added without calculation of the square or calculation of the square root of the radius of the Lissajous waveform using an encoder, so it is possible to reduce the circuit size of the encoder and possible to shorten the calculation time in the case of calculation by software.

While the invention has been described with reference to specific embodiments chosen for purpose of illustration, it should be apparent that numerous modifications could be made thereto by those skilled in the art without departing from the basic concept and scope of the invention.

The invention claimed is:

1. An amplitude calculation apparatus of an output signal of an encoder, comprising:
   a sampling means for sampling, at the same timing, an A-phase sine wave signal or a signal resembling said A-phase sine wave signal and a B-phase sine wave signal or a signal resembling said B-phase sine wave signal differing in phase by exactly a predetermined angle and thereby outputting an A/D converted value A of said A-phase sine wave signal or a signal resembling said A-phase sine wave signal and an A/D converted value B of said B-phase sine wave signal or a signal resembling said B-phase sine wave signal;
   an angle detection circuit for finding a phase angle $\theta$ at different sampling points of a Lissajous waveform obtained by plotting the A/D converted value A of said A-phase sine wave signal or a signal resembling said A-phase sine wave signal and the A/D converted value B of said B-phase sine wave signal or a signal resembling said B-phase sine wave signal at the sampling points by said sampling means on an X-axis and a Y-axis;
   a means for finding a quadrant n of said phase angle $\theta$ from polarities of said A/D converted value A and said A/D converted value B, and converting the phase angle $\theta$ of the quadrant n to a phase angle $\theta'$ of a quadrant 1, where, $\{(n-1)/2\}\pi \leq \theta < (n/2)\pi,$ where n is 4 or a smaller natural number;
   a coefficient storing means for dividing said Lissajous waveform into a predetermined number of angle areas in said quadrant 1 and presetting and storing in advance an A-phase coefficient $\alpha$ and a B-phase coefficient $\beta$ in accordance with the divided angle areas, in which case, said coefficients being set so that $\alpha|A|+\beta|B|$ approximates a radius of a theoretical Lissajous waveform; and a calculating means for calculating the radius of said Lissajous waveform as $\alpha|A|+\beta|B|$ and making said calculated radius the amplitude of the output signal of the encoder.

2. A non-transitory storage medium containing therein an amplitude calculation program of an output signal of an encoder, said program, when executed by a computer, causing the computer to perform:
   a step of sampling, at the same timing, an A-phase sine wave signal or a signal resembling said A-phase sine wave signal and a B-phase sine wave signal or a signal resembling said B-phase sine wave signal differing in phase by exactly a predetermined angle and thereby outputting an A/D converted value A of said A-phase sine wave signal or a signal resembling said A-phase sine wave signal and an A/D converted value B of said B-phase sine wave signal or a signal resembling said B-phase sine wave signal;
   a step of finding a phase angle $\theta$ at different sampling points of a Lissajous waveform obtained by plotting the A/D converted value A of said A-phase sine wave signal or a signal resembling said A-phase sine wave signal and the A/D converted value B of said B-phase sine wave signal or a signal resembling said B-phase sine wave signal at the sampling points by said sampling means on an X-axis and a Y-axis;
   a step of finding a quadrant n of said phase angle $\theta$ from polarities of said A/D converted value A and said A/D converted value B, and converting the phase angle $\theta$ of the quadrant n to a phase angle $\theta'$ of a quadrant 1, where, $\{(n-1)/2\}\pi \leq \theta < (n/2)\pi,$ where n is 4 or a smaller natural number;
   a step of dividing said Lissajous waveform into a predetermined number of angle areas in said quadrant 1 and presetting and storing in advance an A-phase coefficient $\alpha$ and a B-phase coefficient $\beta$ in accordance with the divided angle areas, in which case, said coefficients being set so that $\alpha|A|+\beta|B|$ approximates a radius of a theoretical Lissajous waveform; and
   a step of calculating the radius of said Lissajous waveform as $\alpha|A|+\beta|B|$ and making said calculated radius the amplitude of the output signal of the encoder.

* * * * *